United States Patent
Chakraborty et al.

(10) Patent No.: US 12,367,636 B2
(45) Date of Patent: Jul. 22, 2025

(54) VIRTUAL POSE RENDERING USING NEURAL RADIANCE MODEL

(71) Applicant: Microsoft Technology Licensing, LLC, Redmond, WA (US)

(72) Inventors: Ishani Chakraborty, Seattle, WA (US); Jonathan Carl Hanzelka, Kenmore, WA (US); Vibhav Vineet, Bellevue, WA (US); Pedro Urbina Escos, Seattle, WA (US); Vicente A. Rivera, Issaquah, WA (US); Gavin Jancke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 18/153,942

(22) Filed: Jan. 12, 2023

(65) Prior Publication Data
US 2024/0242423 A1    Jul. 18, 2024

(51) Int. Cl.
*G06T 15/20*    (2011.01)
*G06T 7/80*    (2017.01)

(52) U.S. Cl.
CPC ............. *G06T 15/205* (2013.01); *G06T 7/80* (2017.01)

(58) Field of Classification Search
CPC ................................ G06T 7/80; G06T 15/205
See application file for complete search history.

(56) References Cited

U.S. PATENT DOCUMENTS

| 10,235,809 B2 | 3/2019 | Evans |
| 11,087,479 B1* | 8/2021 | Geraghty .............. G06T 19/006 |
| 2023/0230275 A1* | 7/2023 | Lin ........................ G06T 7/70 382/103 |

OTHER PUBLICATIONS

Mildenhall et al., "Nerf: Representing scenes as neural radiance fields for view synthesis" European conference on computer vision, pp. 405-421. Springer, 2020. (Year: 2020).*
International Search Report and Written Opinion received for PCT Application No. PCT/US2023/084975, May 7, 2024, 17 pages.
Li, et al., "Magic NeRF Lens: Interactive Fusion of Neural Radiance Fields for Virtual Facility Inspection", arXiv:2307.09860V1, Jul. 19, 2023, 12 pages.
Li, et al., "NeRF-Pose: A First-Reconstruct-Then-Regress Approach for Weakly-supervised 6D Object Pose Estimation", IEEE/CVF International Conference on Computer Vision Workshops, Mar. 2022, 12 pages.

(Continued)

*Primary Examiner* — Sing-Wai Wu
(74) *Attorney, Agent, or Firm* — Alleman Hall & Tuttle LLP

(57) ABSTRACT

A method for virtual object pose rendering includes receiving a digital image of a real-world object in a real-world environment. An imaged pose of the real-world object is estimated based at least in part on a neural radiance model encoding 3D (three-dimensional) spatial data for the real-world object, the neural radiance model derived from a plurality of previously captured digital images of the real-world object. A view of a virtual object corresponding to the real-world object is rendered based at least in part on the neural radiance model, such that the virtual object has a virtual pose consistent with the imaged pose of the real-world object in the digital image.

17 Claims, 12 Drawing Sheets

(56) References Cited

OTHER PUBLICATIONS

Li, et al., "RealityGit: Cross Reality Version Control of R&D Optical Workbench", IEEE International Symposium on Mixed and Augmented Reality Adjunct, Oct. 16, 2023, 2 pages.

Park, et al., "InstantXR: Instant XR Environment on the Web Using Hybrid Rendering of Cloud-based NeRF with 3D Assets", In Proceedings of the 23rd International Middleware Conference Doctoral Symposium, 2022, 9 pages.

Xiao, et al., "NeuralPassthrough: Learned Real-Time View Synthesis for VR", In Proceedings of the 1st ACM Sigspatial International Workshop on Geospatial Knowledge Graphs, Jul. 27, 2022, 9 pages.

Yang, et al., "Learning Object-Compositional Neural Radiance Field for Editable Scene Rendering", IEEE/CVF International Conference on Computer Vision, Oct. 10, 2021, 10 pages.

Yen-Chen, et al., "NeRF-Supervision: Learning Dense Object Descriptors from Neural Radiance Fields", In Proceedings of International Conference on Robotics and Automation, May 23, 2022, pp. 6496-6503.

Chen, et al., "Transformers as Meta-Learners for Implicit Neural Representations", In Proceedings of 17th European Conference on Computer Vision, Oct. 23, 2022, pp. 170-187.

Collins, et al., "ABO: Dataset and Benchmarks for Real-World 3D Object Understanding", In Proceedings of the IEEE/CVF Conference on Computer Vision and Pattern Recognition, Jun. 18, 2022, pp. 21126-21136.

Downs, et al., "Google Scanned Objects: A High-Quality Dataset of 3D Scanned Household Items", In Proceeding of IEEE International Conference on Robotics and Automation, May 23, 2022, pp. 2553-2560.

Ge, et al., "Neural-Sim: Learning to Generate Training Data with NeRF", In Proceedings of 17th European Conference on Computer Vision, Oct. 23, 2022, pp. 477-493.

Munkberg, et al., "Extracting Triangular 3D Models, Materials, and Lighting From Images", In Proceedings of the IEEE/CVF Conference on Computer Vision and Pattern Recognition, Jun. 18, 2022, pp. 8280-8290.

Oechsle, et al., "UNISURF: Unifying Neural Implicit Surfaces and Radiance Fields for Multi-View Reconstruction", In Proceedings of the IEEE/CVF International Conference on Computer Vision, Oct. 10, 2021, pp. 5589-5599.

Sun, et al., "LoFTR: Detector-Free Local Feature Matching with Transformers", In Proceedings of the IEEE/CVF Conference on Computer Vision and Pattern Recognition, Jun. 19, 2021, pp. 8922-8931.

Wang, et al., "NeuS: Learning Neural Implicit Surfaces by Volume Rendering for Multi-view Reconstruction", In Proceedings of 35th Annual Conference on Neural Information Processing Systems, Dec. 6, 2021, 13 Pages.

Xie, et al., "Neural Fields in Visual Computing and Beyond", In Journal of Computer Graphics Forum, vol. 41, Issue 2, May 24, 2022, pp. 641-676.

\* cited by examiner

300

```
┌─────────────────────────────────────────────────────────────┐
│  RECEIVE A DIGITAL IMAGE OF A REAL-WORLD OBJECT IN A REAL-  │
│                    WORLD ENVIRONMENT                         │
│                                                         302  │
└─────────────────────────────────────────────────────────────┘
                              │
                              ▼
┌─────────────────────────────────────────────────────────────┐
│  ESTIMATE AN IMAGED POSE OF THE REAL-WORLD OBJECT BASED     │
│  AT LEAST IN PART ON A NEURAL RADIANCE MODEL DERIVED FROM A │
│    PLURALITY OF PREVIOUSLY-CAPTURED DIGITAL IMAGES OF THE   │
│                      REAL-WORLD OBJECT                       │
│                                                         304  │
└─────────────────────────────────────────────────────────────┘
                              │
                              ▼
┌─────────────────────────────────────────────────────────────┐
│   RENDER A VIEW OF A VIRTUAL OBJECT CORRESPONDING TO THE    │
│   REAL-WORLD OBJECT, SUCH THAT THE VIRTUAL OBJECT HAS A     │
│  VIRTUAL POSE CONSISTENT WITH THE IMAGED POSE OF THE REAL-  │
│                        WORLD OBJECT                          │
│                                                         306  │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│      TRANSMIT THE VIEW OF THE VIRTUAL OBJECT FOR DISPLAY     │
│                                                         308  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│        DISPLAY THE VIRTUAL VIEW VIA A NEAR-EYE DISPLAY       │
│                                                         310  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 3

VIRTUAL POSE RENDERING USING NEURAL RADIANCE MODEL

BACKGROUND

Head-mounted display devices (HMDs) are used to provide virtual reality (VR) and/or augmented reality (AR) experiences, in which virtual objects are presented that augment or replace aspects of a user's surrounding real-world environment. For instance, AR experiences can be used to present computer-generated objects or images that appear to coexist with the user in their real-world surroundings, despite not being real. VR experiences, by contrast, often substantially replace the user's view of their surroundings with computer-generated content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is generally directed to rendering a pose for a virtual object that is consistent with a corresponding real-world counterpart. First, one or more images of the real-world object are captured. An imaged pose (e.g., position and orientation) of the real-world object is estimated based at least in part on a neural radiance model, which encodes 3D (three-dimensional) spatial data for the real-world object. The neural radiance model is derived from a plurality of digital images previously captured of the real-world object. A view of a virtual object, resembling the real-world object, is then rendered having a virtual pose consistent with the estimated pose of the real-world object. In some examples, the view of the virtual object is then displayed, such that the virtual object is aligned with the real-world object—e.g., causing the virtual object to serve as a realistic representation of the real-world object in a virtual environment.

BRIEF DESCRIPTION OF THE DRAWINGS

FIG. 3 illustrates an example method for virtual pose rendering.

DETAILED DESCRIPTION

Figure 1:
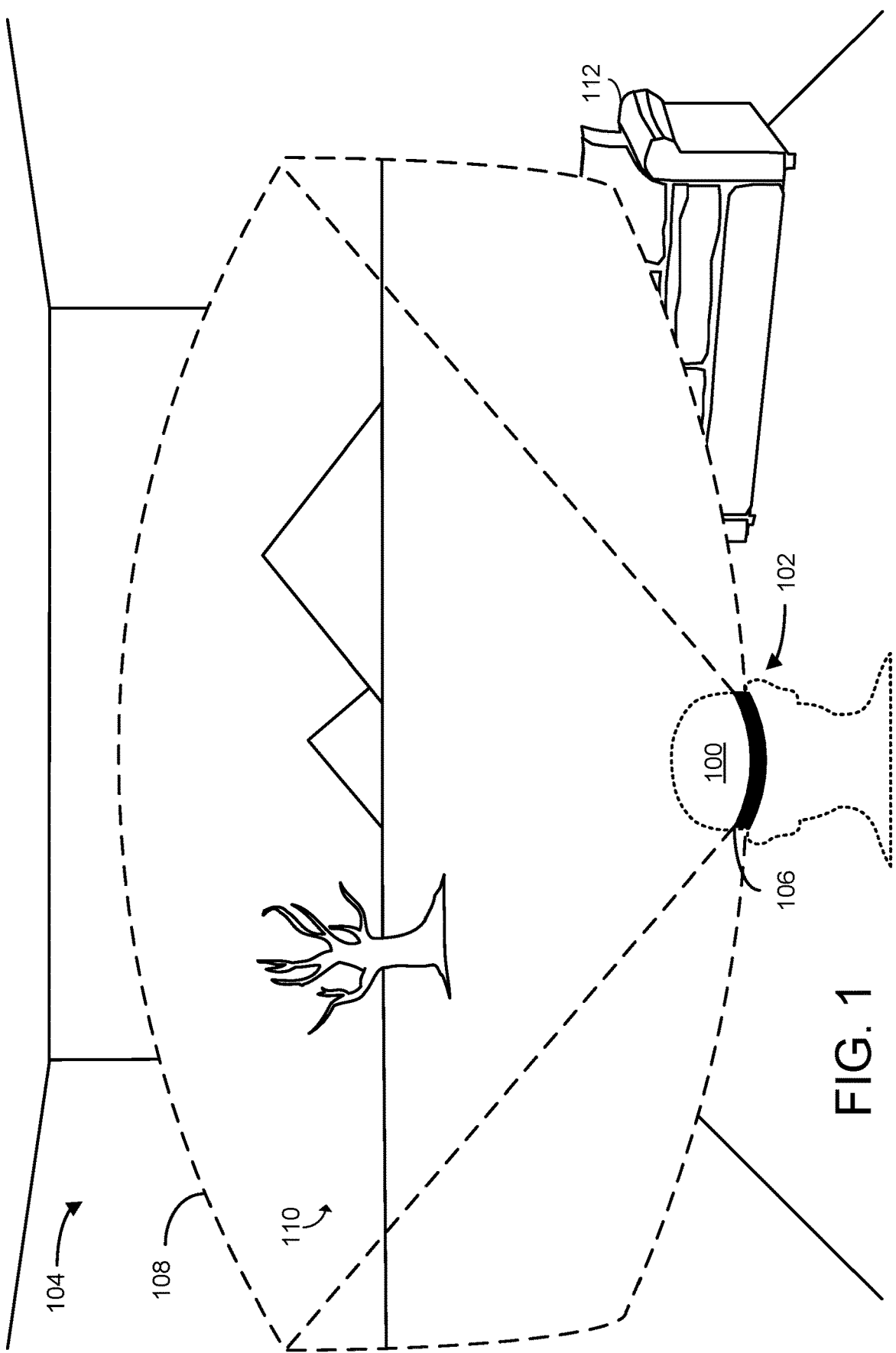
FIG. 1 schematically illustrates use of an example head-mounted display device (HMD).

Virtual reality (VR) experiences typically replace a user's view of their real-world surroundings with computer-generated imagery. For instance, FIG. 1 schematically shows a user 100 using a head-mounted display device (HMD) 102 in a real-world environment 104. Via a near-eye display 106 of the HMD, user 100 has a field-of-view (FOV) 108 in which virtual imagery presented by the HMD causes the user to perceive a virtual environment 110. Although the present disclosure primarily focuses on VR experiences, it will be understood that the HMD is in some cases useable to provide augmented reality (AR) experiences in addition to, or instead of, VR experiences. For instance, in some examples the near-eye display is fully opaque, or in other examples is at least partially transparent.

In the example of FIG. 1, the virtual environment is presented as a series of virtual image frames displayed to the eyes of the user via the near-eye display, such that the user's view of their surrounding real-world environment is partially, or entirely, replaced by virtual content. For instance, a real-world couch 112 present within the real-world environment is not visible within the user's FOV 108. It will be understood that the specific scenario depicted in FIG. 1, including the virtual environment 110, is non-limiting.

As illustrated in FIG. 1, it can be difficult for a user to interact with real-world objects while participating in a VR experience, due to the user's inability to see the real-world objects. In one example scenario, a user is drinking a beverage from a real-world container while using an HMD to participate in a VR experience, such as a video game, remote meeting, virtual workspace, etc. However, the virtual images presented on the near-eye display block the user's view of the real-world container, along with other aspects of the user's real-world surroundings, making it difficult for the user to continue drinking their beverage.

To address this, the container could in some examples be represented in the virtual experience using a virtual model—e.g., a virtual container that is displayed in the virtual environment at the same position relative to the user as the real container, serving as a virtual representation within the virtual environment. However, it would still be difficult to interact with the real container unless the virtual representation has a very similar appearance and pose to the real container. For instance, even a slight difference in the shape, size, or position of a coffee mug's handle could cause the user to miss the handle when reaching for the mug, accidentally spilling their beverage. Furthermore, generating a virtual object model that closely matches the appearance of a corresponding real-world object is often difficult and time-consuming, requiring significant manual effort by a human artist.

The present disclosure is therefore directed to techniques for rendering a virtual object model having a virtual pose that is consistent with the real pose of a corresponding real-world object. A "pose" generally refers to the position and orientation of an object relative to a particular frame of reference. For instance, in some examples, an object "pose" refers to a six degree-of-freedom pose expressing the position and orientation of the object according to three translational axes and three rotational axes relative to the world coordinates.

According to the techniques described herein, a digital image of a real-world object is captured and used to render a view of a corresponding virtual object, based at least in part on 3D spatial data for the real-world object encoded by a neural radiance model. In the rendered view, the virtual object has a virtual pose consistent with the imaged pose of the real-world object. The virtual object view can then be displayed as part of a virtual environment—e.g., enabling the virtual object to serve as a realistic representation of the real object within a VR experience. The neural radiance model is derived from a plurality of previously captured images of the real-world object. In some examples, the real-world object is a single, specific real-world object. For instance, the neural radiance model is generated for a user's specific keyboard and not, for instance, all keyboards in general, or all keyboards of a specific model number.

This provides the benefit of improving human-computer interaction by enabling users to participate in VR experiences more effectively—e.g., a user is able to manipulate a virtual experience using their real-world keyboard, and/or participate in the virtual experience without fear that they will disrupt their real-world surroundings (such as by tipping over a beverage). Furthermore, the techniques described herein provide the technical benefit of reducing the burden of user input to a computing device, enabling the display of accurate and realistic virtual models without requiring significant manual effort by a human artist to create such models.

Figure 2A:
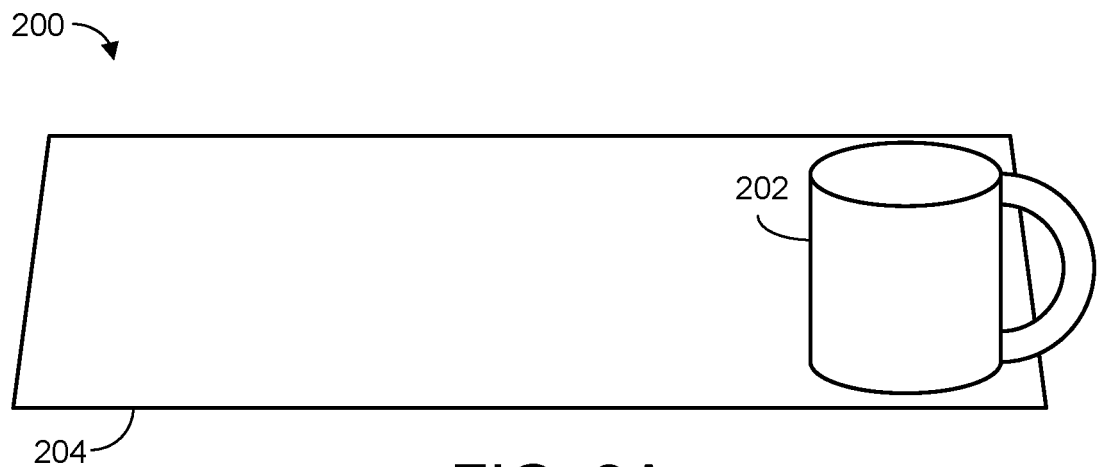
FIGS. 2A-2C schematically illustrate displaying a view of a virtual object corresponding to a real-world object.
Figure 2B:
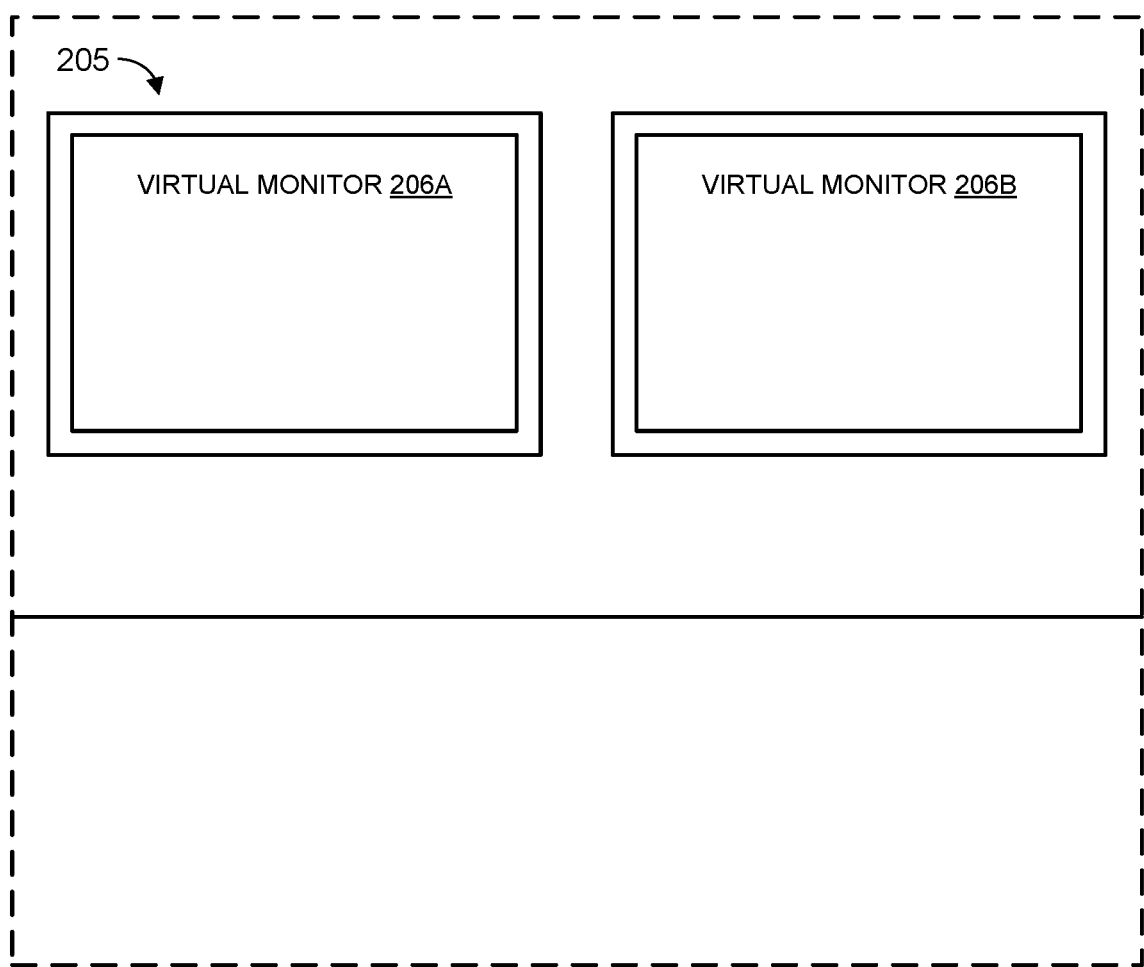
Figure 2C:
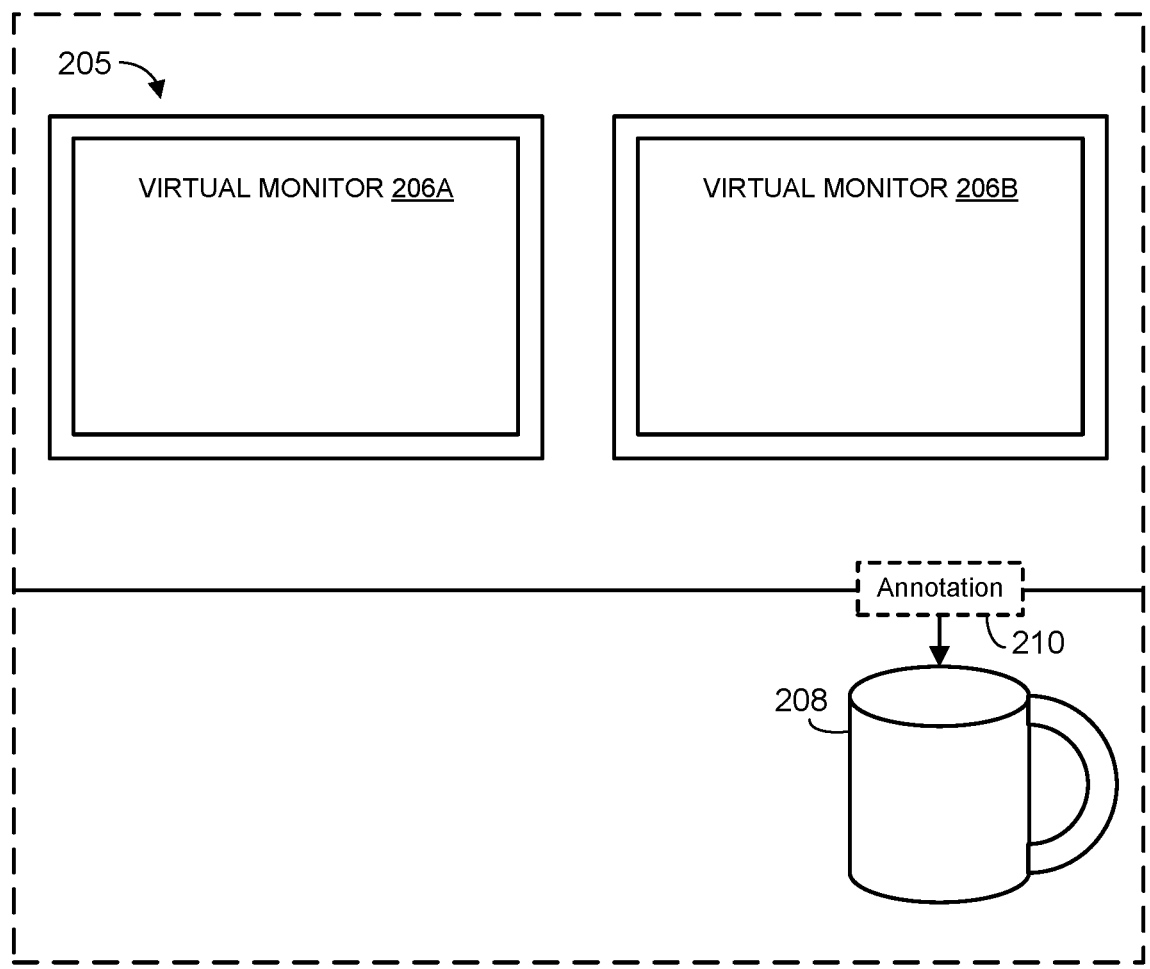

FIGS. 2A-2C schematically illustrate a scenario in which a real-world object is represented in a virtual environment by a virtual object rendered according to the techniques described herein. Specifically, FIG. 2A shows a real-world environment 200, including an example real-world object 202 (taking the form of a coffee mug), resting on a real-world surface 204. In other words, environment 200 is the real-world environment of a user of an HMD who is drinking a beverage from mug 202.

FIG. 2B shows an example virtual environment 205 rendered by the user's HMD. In the example of FIG. 2B, the virtual environment includes two virtual monitors 206A and 206B that are not present in the user's real-world environment—e.g., enabling the user to work, consume video, or collaborate in real-time video calls using the virtual monitors, without requiring the user to purchase or use physical real-world monitors. It will be understood the virtual monitors are non-limiting examples, and that a "virtual environment" as described herein can include any suitable virtual content—such as 3D objects, user interface elements, video content (e.g., streamed footage from a video call), or user avatars/video game characters, as non-limiting examples.

Furthermore, as discussed above, the virtual environment substantially replaces the user's view of their real-world surroundings with computer-generated virtual content. As shown, the real-world mug 202 and real-world surface 204 are no longer visible, as they are hidden by the virtual imagery used to form the virtual environment. Thus, it would be difficult for the user to safely drink their beverage, as it is no longer visible.

As such, turning to FIG. 2C, the HMD renders a virtual object 208 as part of the virtual environment such that, from a virtual viewpoint of the HMD, the virtual object is aligned with the real-world object. In other words, from the perspective of the user, virtual object 208 has a substantially similar appearance and pose to real-world mug 202. This beneficially provides the technical effect of improving human-computer interaction, enabling the user to safely interact with the real-world object while participating in the virtual experience.

In some examples, as changes in the pose of the real-world mug 202 are detected, the HMD updates the rendered pose of the virtual mug to maintain consistency with its real-world counterpart. In other words, as the position and orientation of the real mug change (e.g., due to movement by the human user), the position and orientation of the virtual mug are correspondingly updated. Furthermore, the HMD need not be limited to only rendering one virtual object corresponding to one real-world object, but rather can render any suitable number of different virtual objects for any corresponding number of real objects. For instance, in some examples (e.g., when the HMD is equipped with suitable tracking hardware and software), the HMD renders a virtual hand in the virtual environment, corresponding to a real hand of the user. This beneficially enables the HMD to model and render interactions between the virtual hand and virtual mug, thereby mirroring interactions between the real mug and the user's actual hand—e.g., as the user lifts the mug, the HMD presents virtual imagery depicting the user's virtual hand representation grasping and lifting the mug just as the user is doing in the real world. This provides the technical effect of improving human-computer interaction, enabling the user to more effectively participate in the VR experience.

Additionally, in some examples, the HMD displays one or more virtual annotations proximate to a rendered virtual object. For instance, in FIG. 2C, the HMD displays an annotation 210 proximate to virtual object 208. Such annotations take any suitable form and can include any suitable information. As non-limiting examples, annotations can include parts labels, assembly/disassembly/maintenance instructions, closed captions, live translations, nametags, virtual controls, etc. This beneficially enables augmentation of a real-world object within a virtual environment—e.g., by presenting virtual nametags proximate to virtual representations of other human users—which provides the technical benefits of improving human-computer interaction and reducing the burden of user input to a computing device.

It will be understood that the above scenario is non-limiting, and that an HMD as described herein renders any suitable virtual objects corresponding to any suitable real-world objects. Such virtual objects are rendered as part of any of a wide variety of virtual environments, such environments including any suitable virtual content.

FIG. 3 illustrates an example method 300 for virtual object pose rendering. Steps of method 300 are performed by any suitable computing system of one or more computing devices. A computing device performing any aspect of method 300 has any suitable capabilities, hardware configuration, and form factor. In some examples, any or all of method 300 is performed by an HMD, such as HMD 102. Alternatively, as will be described in more detail below, at least some steps of method 300 are in some examples performed by one or more remote server computing devices communicating with an HMD over a suitable computer network, such as the Internet. In some examples, method 300 is performed by computing system 1000 described below with respect to FIG. 10.

Figure 4:
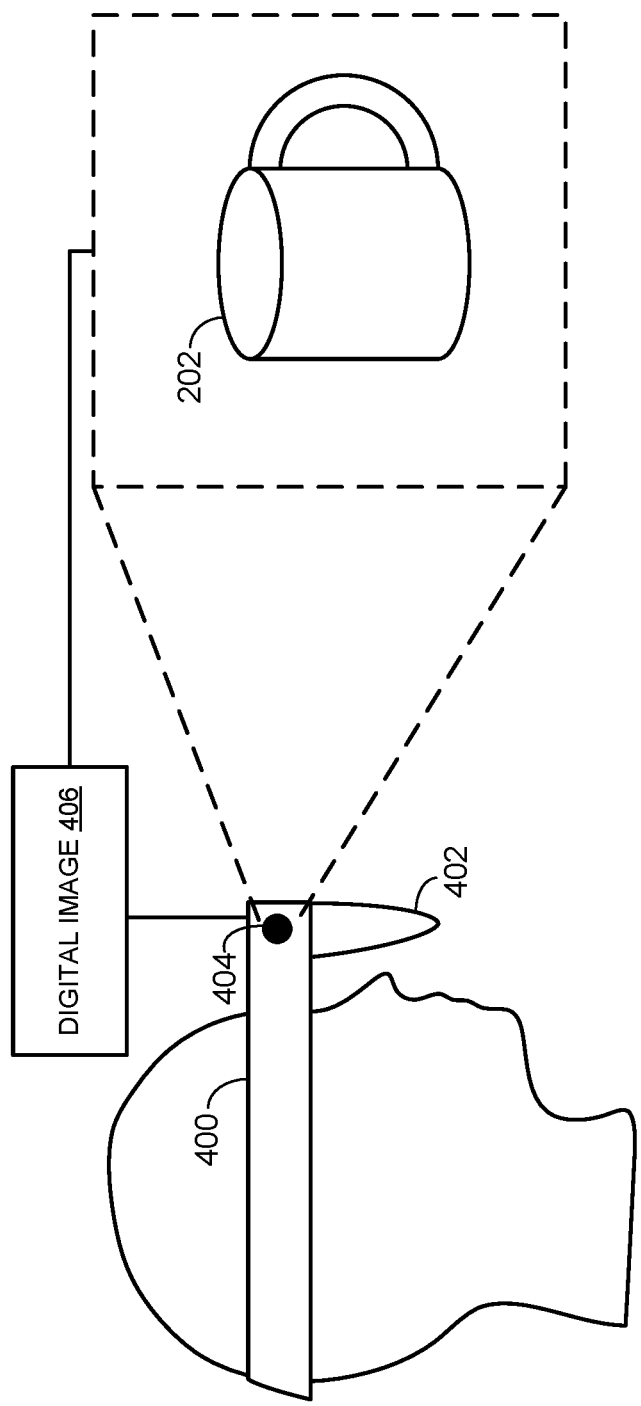
FIG. 4 schematically illustrates an example HMD capturing a digital image of a real-world object.

At 302, method 300 includes receiving a digital image of a real-world object in a real-world environment. This is schematically illustrated with respect to FIG. 4, showing an example HMD 400. HMD 400 includes a near-eye display 402 useable for displaying virtual imagery to present a virtual experience, as described above. In this example, HMD 400 includes a camera 402, and the digital image of the real-world object is captured via the camera of the HMD. Specifically, in FIG. 4, the HMD captures a digital image 406 of a real-world environment, the image depicting real-world mug 202.

It will be understood that the digital image of the real-world object is captured by any suitable array of one or more cameras, having any suitable capabilities and configuration (e.g., resolution, framerate, wavelength sensitivity). In the example of FIG. 4, the digital image is captured by a camera that is integrated into a housing of the HMD. Additionally, or alternatively, digital images are captured by one or more cameras external to the HMD. Use of an integrated camera as is shown in FIG. 4 beneficially ensures that the imaged pose of the real-world object will be similar to the apparent pose of the object from the user's point of view, reducing or eliminating the need to perform any downstream pose corrections to account for differences between the camera point of view and user eye point of view. This beneficially provides the technical effects of improving human-computer interaction and conserving computational resources. In some cases, in addition to capturing the digital image of the real-world object, the HMD records a pose of the camera at the time of capture.

Furthermore, in some examples, "receiving" the digital image of the real-world object includes receiving the digital image over a computer network (e.g., the Internet), after the digital image is first captured by a remote device. For instance, as discussed above, any or all steps of method 300 are in some examples performed by a server computing device. Thus, in some examples, step 302 of method 300 includes a server computing device receiving the digital image over a computer network—e.g., after the digital image is first captured and transmitted by an HMD (and/or other suitable camera device).

Returning briefly to FIG. 3, at 304, method 300 includes estimating an imaged pose of the real-world object based at least in part on a neural radiance model encoding 3D spatial data for the real-world object. A "neural radiance model" in some examples refers to a neural network that is previously trained to output arbitrary virtual images of a virtual object at novel poses, based at least in part on the 3D spatial data for the real-world object. This is done after identifying correspondences between a plurality of previously captured input images depicting the real-world object—e.g., identifying pixels of one input image that depict the same portion of the real-world object as pixels a different input image.

In some examples, this includes generating a volumetric representation of the imaged object by arranging the input images within a 3D coordinate space surrounding the geometric center of the input object, and projecting rays between the camera center and pixels of the input images. In some examples, the images are arranged in the 3D coordinate space based on the known pose of the camera at the time each image was captured. This process of generating the neural radiance model can be described as optimizing a continuous volumetric function corresponding to the imaged object. One non-limiting example of a suitable neural field model is the NeRF (neural radiance field) model. Non-limiting examples of suitable machine-learning and/or artificial intelligence techniques useable for generating and training a neural radiance model will be described below with respect to FIG. 10.

Figure 5:
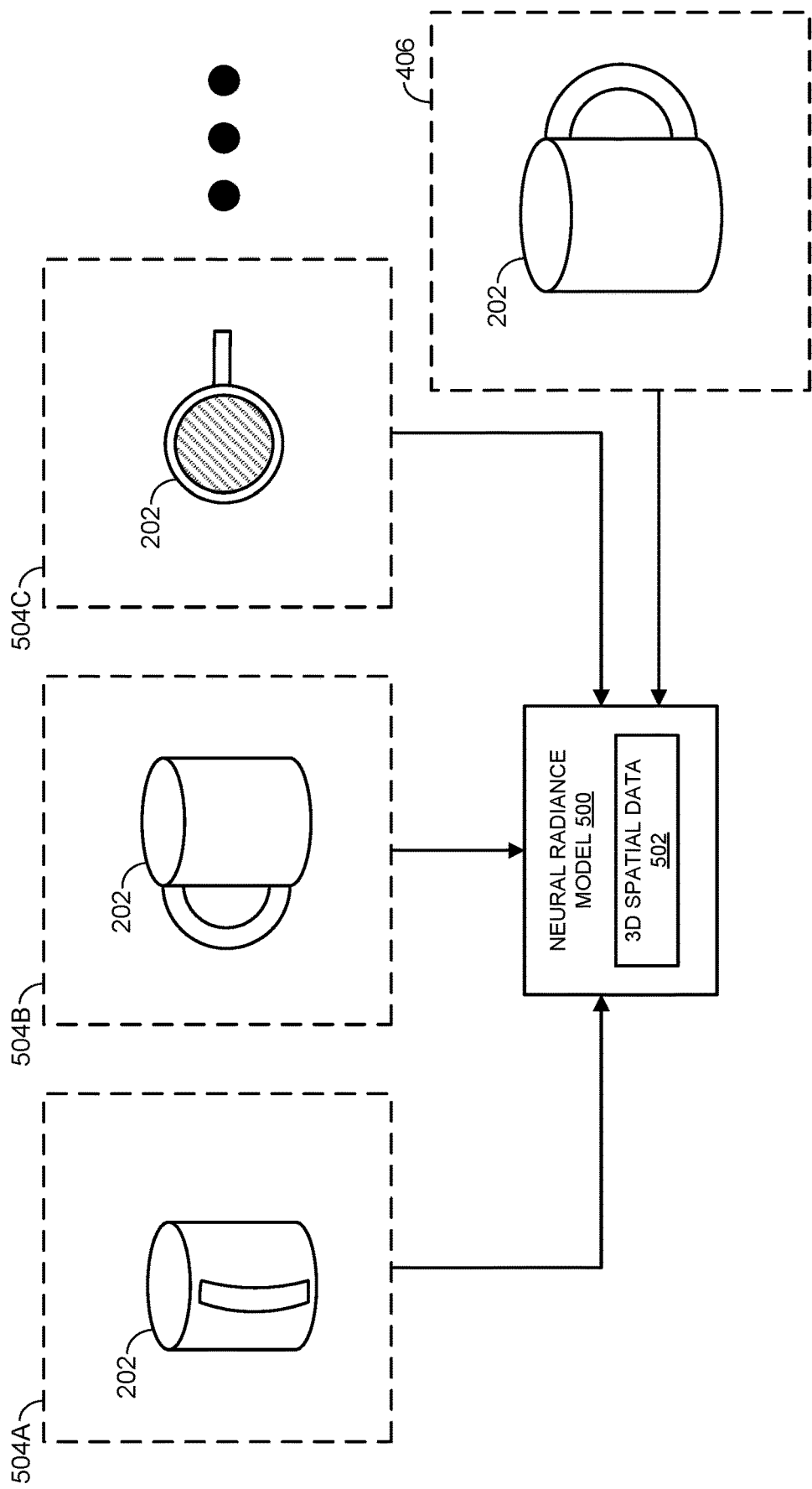
FIG. 5 schematically shows a neural radiance model derived from a plurality of previously captured digital images of a real-world object.

As discussed above, the neural radiance model is derived from a plurality of previously captured digital images of the real-world object. This is schematically illustrated with respect to FIG. 5, showing an example neural radiance model 500 encoding 3D spatial data 502 corresponding to real-world object 202. Such 3D spatial data is derived from a plurality of previously captured digital images 504A-504C of real-world object 202, captured from various angles and viewpoints. It will be understood that, although FIG. 5 only shows three previously captured images, the neural radiance model is derived from any suitable number of previously captured images. In some examples, the plurality of previously captured images of the real-world object are captured via the camera of the HMD—e.g., camera 404 of HMD 400. Additionally, or alternatively, any or all of the previously captured images are captured by a different suitable camera external to the HMD.

In some examples, the plurality of previously captured images are "casually captured"—e.g., they are passively captured over time as a user is using the HMD and/or other camera device. This beneficially enables generation of the neural radiance model without requiring special effort on the part of the user to capture specific images, thereby providing the technical effect of reducing the burden of user input to the computing device. Additionally, or alternatively, one or more of the plurality of previously captured images are captured intentionally for the purpose of providing input images for a neural radiance model—e.g., staged in a photography lightbox. As discussed above with respect to the digital image of the real-world environment, in some cases capturing the images used for generating the neural radiance model also includes recording the pose of the camera at the time each image was captured.

In some cases, the neural model is updated each time a new digital image of the real-world object is captured. For instance, after capturing digital image 406 via camera 404, HMD 400 of FIG. 4 updates the neural radiance model with additional 3D spatial data derived from the digital image—e.g., after identifying correspondences between the new digital image and the previously captured images, and updating the continuous volumetric function based on the new correspondences. This is schematically illustrated with respect to FIG. 5, in which digital image 406 also contributes to the 3D spatial data 502 encoded by neural radiance model 500.

As discussed above, the imaged pose of the real-world object is estimated based at least in part on the neural radiance model. However, the specific manner in which this is done varies depending on the implementation. In some examples, the neural radiance model is first used to train an inference model based on synthetic object views depicting a virtual object from a variety of arbitrary viewpoints. In other examples, the neural radiance model itself is trained in proxy to estimate the pose of the real-world object, as will be described in more detail below.

In cases where synthetic object views are generated, the synthetic object views can then be used to train an inference model, which is useable to estimate the pose of the real-world object when provided with a digital image. In other words, in some examples, the imaged pose of the real-world object is estimated by an inference model having been previously-trained based at least in part on a plurality of synthetic object views generated from the 3D spatial data of the neural radiance model. For instance, each synthetic object view provided to the inference model during training is paired with the actual pose of the virtual object for which the view is rendered. Over time, via a suitable training process, the inference model is trained to accurately estimate the object pose for new input views, for which the object's actual pose is not specified. Non-limiting examples of suitable artificial intelligence and/or machine learning techniques for training an inference model are described below with respect to FIG. 10.

Figure 6A:
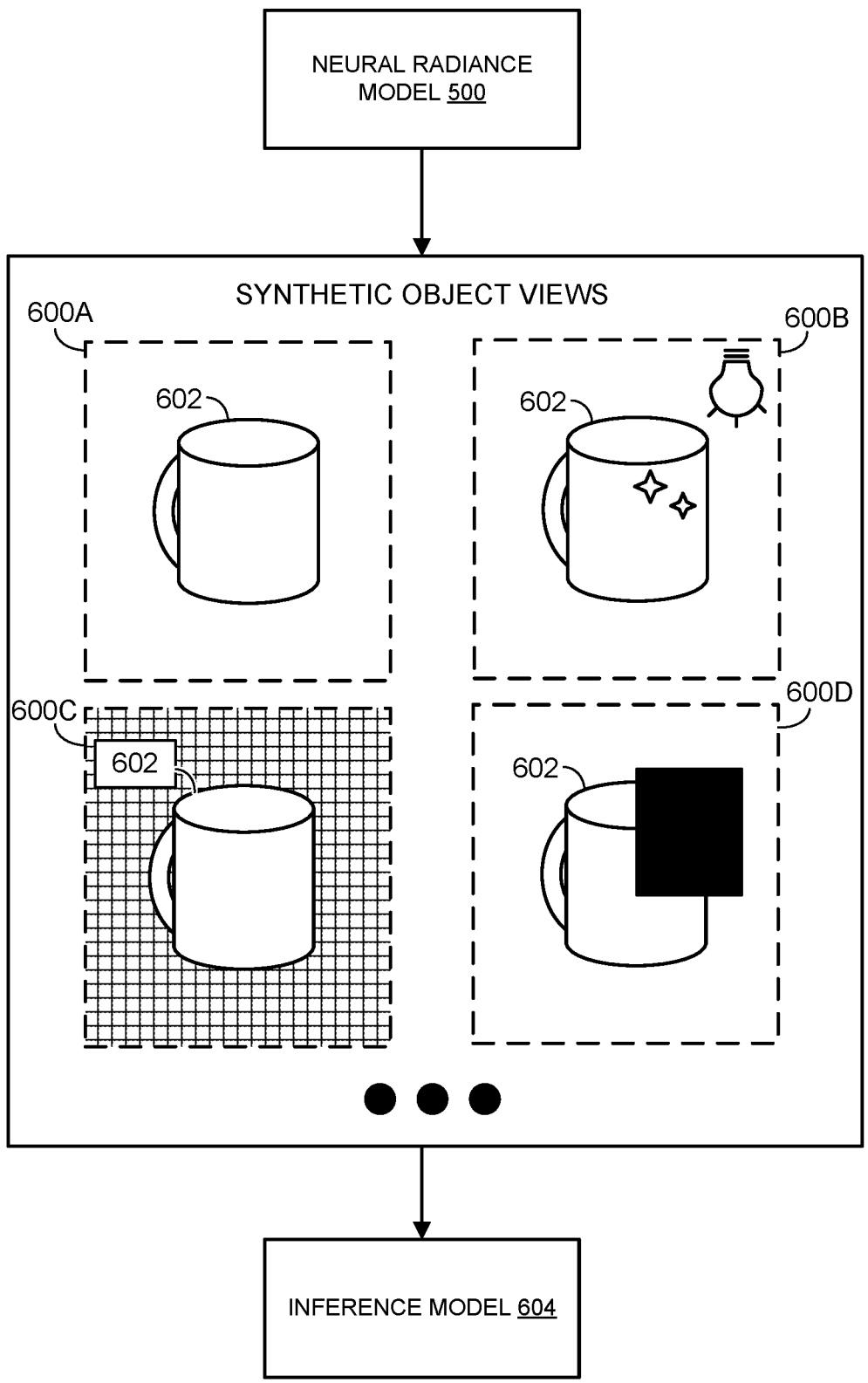
FIGS. 6A and 6B schematically illustrate training and use of an inference model to estimate the imaged pose of a real-world object.
Figure 6B:
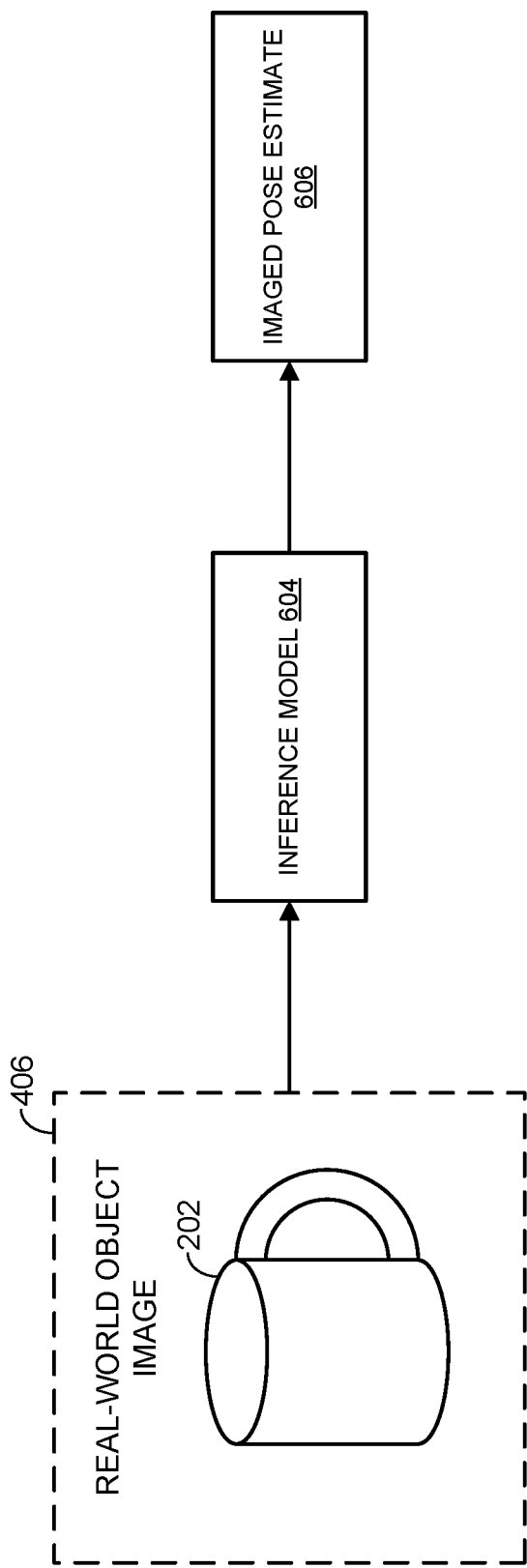

This is schematically illustrated with respect to FIGS. 6A and 6B. Specifically, FIG. 6A schematically shows neural radiance model 500. As discussed above, the neural radiance model is trained to output arbitrary virtual poses of a virtual object, based at least in part on the optimized volumetric function identified between a plurality of previously captured images of a real-world object. In some examples, this includes extracting an explicit mesh from the 3D spatial data of the neural radiance model, and rendering the mesh from multiple views, with different lighting and background conditions.

In FIG. 6A, the neural radiance model is used to output a plurality of synthetic object views 600A-600D, each depicting a virtual object 602 that resembles real-world object 202. The synthetic object views are used to train an inference model 604. Although only four synthetic object views are shown in FIG. 6A, it will be understood that this is not limiting. Rather, the neural radiance model may be used to output any suitable number of synthetic object views for training an inference model.

Performance of an inference model can beneficially be improved by including relatively diverse images in the training data set, thereby training the model on a relatively wider variety of conditions in which the real-world object may be imaged. To this end, in some examples, generating the plurality of synthetic object views includes varying one or more of the lighting conditions, background conditions, occlusions, and virtual object poses between one or more of the plurality of synthetic object views. This provides the technical effect of improving performance of the inference model, by enabling the inference model to more accurately estimate the pose of imaged objects.

This is schematically illustrated with respect to FIG. 6A. Specifically, as shown, various differences are introduced to each of the plurality of synthetic object views to improve the diversity of the input training data. For instance, synthetic object view 600B has alternate lighting conditions, synthetic object view 600C has an alternate background behind the virtual object, and synthetic object view 600D has an occlusion placed in front of the virtual object. It will be understood that these examples are non-limiting, and that the synthetic views used for training an inference model can be varied in any of a wide variety of suitable ways.

Once the inference model is trained via the plurality of synthetic object views, it is useable to estimate the imaged pose of the real-world object captured in the digital image. This is schematically illustrated with respect to FIG. 6B, in which digital image 406 depicting real-world object 202 is passed to inference model 604. The inference model then outputs an estimate 606 of the imaged pose of the real-world object, as previously trained. As discussed above, the inference model is implemented via any suitable machine learning and/or artificial intelligence techniques, non-limiting examples of which will be described with respect to FIG. 10.

In some examples, rather than training an inference model to estimate the imaged pose of the real-world object, this estimate is done by the neural radiance model. In other words, the neural radiance model itself is trained to solve the proxy task of estimating the imaged pose of the real-world object—e.g., the neural radiance model is inverted to solve a perception task. Provided sufficient training, this enables the neural radiance model to be used as an efficient data generator—e.g., the emergent features used to render images of an object across novel views are also useable to facilitate dense correspondences across such views. Jointly optimizing the neural radiance model both for reconstruction and registration can solve the twin problems of analysis and synthesis in rendering virtual object views for VR experiences. Thus, in some examples, the neural field model is trained to estimate the imaged pose of the real-world object, and output the virtual pose consistent with the imaged pose, based at least in part on 2D-to-3D dense correspondences between the digital image and the 3D spatial data of the neural field model.

Figure 7:
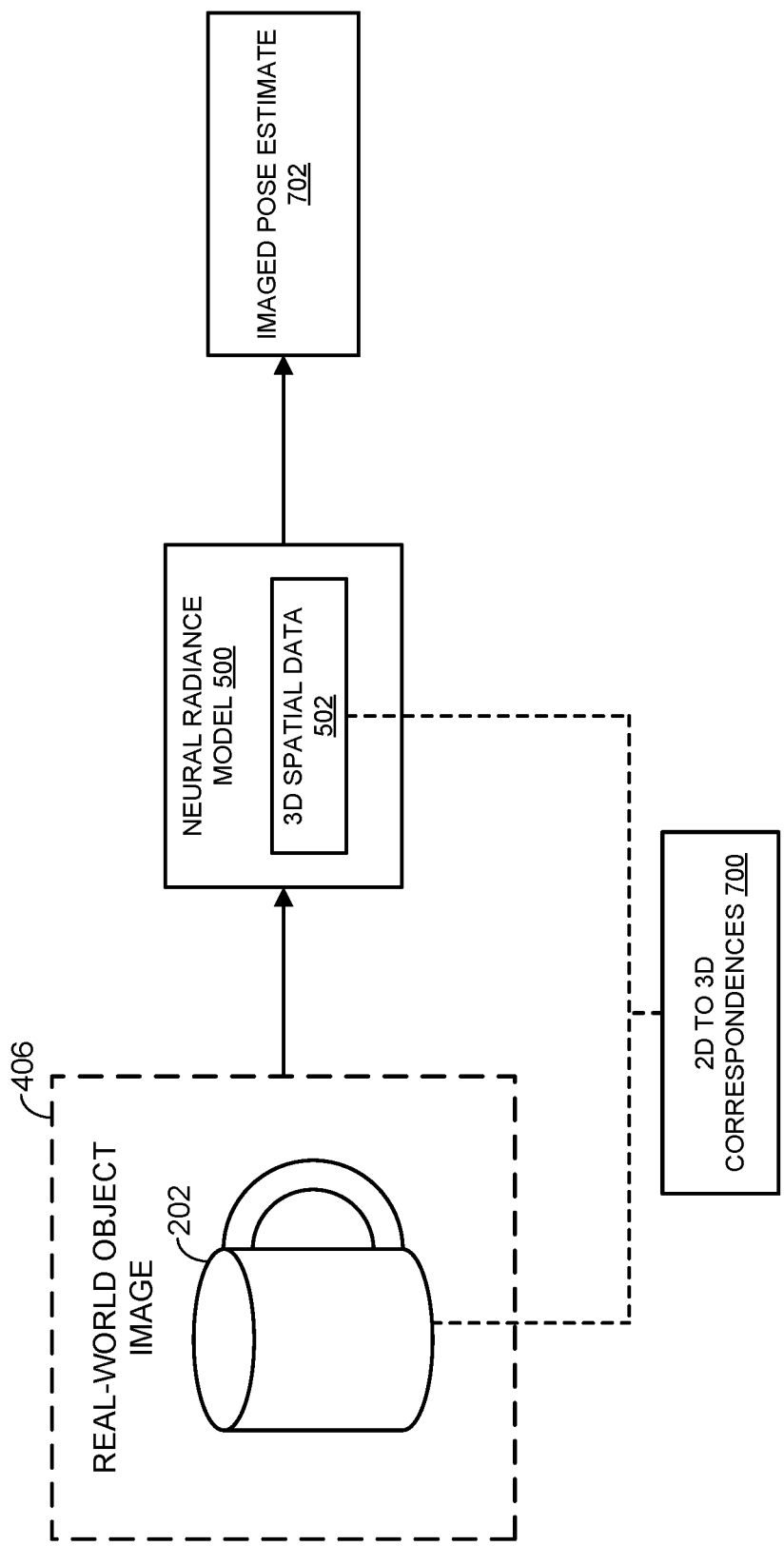
FIG. 7 schematically illustrates use of a neural radiance model to estimate the imaged pose of a real-world object.

This is schematically illustrated with respect to FIG. 7, again showing neural radiance model 500 including 3D spatial data 502. The computing system identifies 2D-to-3D correspondences 700 between the 2D pixel data of digital image 406*n*, and the 3D spatial data of the neural radiance model, causing the model to output an estimate 702 of the imaged pose of the real-world object. Such an estimate is output in any suitable way. As one non-limiting example, the pose estimate is output via a perspective-n-point (PNP) process, which is used to estimate the pose of an object captured in an image based on a projection of the 2D image data onto a set of 3D points.

In any case, once the imaged pose of the real-world object is estimated, the computing system renders a view of a virtual object consistent with the imaged pose. Returning briefly to FIG. 3, at 306, method 300 includes rendering a view of a virtual object corresponding to the real-world object based at least in part on the neural radiance model, such that the virtual object has a virtual pose consistent with the imaged pose of the real-world object in the digital image.

Figure 8:
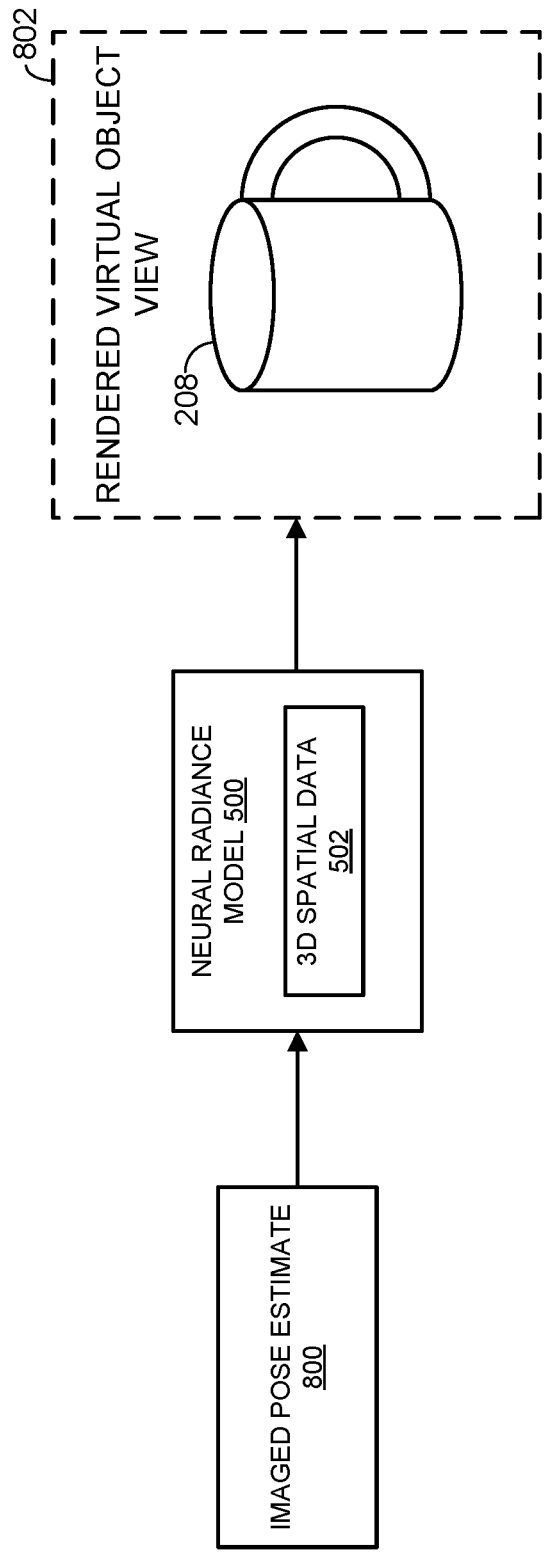
FIG. 8 schematically illustrates rendering a view of a virtual object based at least in part on a neural radiance model.

This is schematically illustrated with respect to FIG. 8, again showing neural radiance model 500. As shown, based on an estimate 800 of the imaged pose of the real-world object, the neural radiance model outputs a virtual object view 802 depicting virtual object 208, having an appearance and pose that is consistent with the digital image of the real-world object. As discussed above, the imaged pose of the real-world object is estimated in any suitable way—e.g., via an inference model trained on synthetic object views output by the neural radiance model, or via the neural radiance model itself. Furthermore, the neural radiance model is used to generate the rendered view of the virtual object in any suitable way—e.g., by extracting a 3D mesh from the neural radiance field, and rendering it from a particular viewpoint to generate an image in which the virtual object has a virtual pose consistent with the pose estimate for the real-world object.

Notably, in some examples, the computing system is configured to render the view of the virtual object with a variable level of detail. For instance, in cases where high-fidelity recreation of the real-world object in the virtual environment is not required, then the virtual object view can beneficially be rendered at a relatively lower level of detail to conserve computational resources of the computing device performing the rendering. In some examples, the level of detail of the virtual object view is dynamically scaled up or down depending on device resource availability, scene complexity, current battery level, user preference, and/or any other suitable variables. This beneficially provides the technical effect of reducing consumption of computational resources.

It will be understood that the virtual object view is rendered by any suitable computing device, or computing system of one or more computing devices. For instance, in some examples, the view of the virtual object is rendered by the HMD—e.g., the same device used to capture the digital image of the real-world object, and present the virtual object view as part of a VR experience.

However, in other examples, computational resources of the HMD are beneficially preserved by outsourcing at least some rendering of virtual object views to a separate computing device—e.g., a separate device in the same local environment, or a remote computer. For instance, in some examples, the view of the virtual object is rendered by a server computing device that receives the digital image of the real-world object over a computer network. After rendering, the server computing device transmits the view of the virtual object back over the computer network for display by an HMD.

Figure 9:
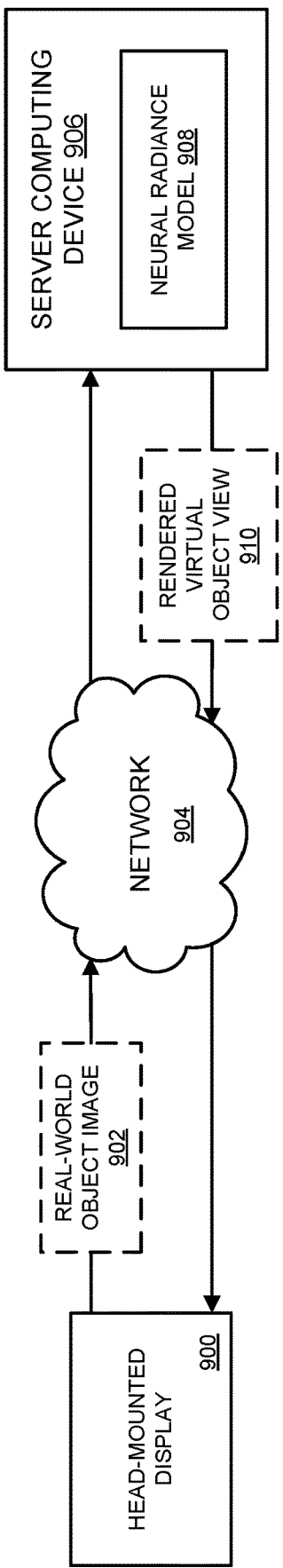
FIG. 9 schematically illustrates a server computing device rendering a view of a virtual object based on a digital image from a remote HMD.

As such, returning briefly to FIG. 3, at 308, method 300 optionally includes transmitting the view of the virtual object over a computer network for display. This is schematically illustrated with respect to FIG. 9. Specifically, FIG. 9 schematically shows an example HMD 900 transmitting an image 902 of a real-world object over a computer network 904. The computer network takes the form of any suitable local or wide area computer network including, for example, the Internet. In this example, the device transmitting the digital image of the real-world object is the same device that eventually receives and displays the rendered view of the virtual object, although it will be understood that this need not always be the case. Rather, in some examples, the digital image is captured and/or transmitted by one device, which is different from a second device that ultimately receives and displays the rendered virtual object view.

The image of the real-world object is received by a server computing device 906, which maintains a neural radiance model 908 corresponding to the real-world object. As described above, the neural radiance model is generated based on a plurality of previously captured images of the real-world object—e.g., previously transmitted to the server by HMD 900 and/or another suitable camera device. The server computing device estimates an imaged pose of the real-world object in the digital image, and renders a virtual object view 910 for transmission back to the HMD over computer network 904.

In any case, upon rendering, the view of the virtual object is in some cases displayed for viewing by a user. For instance, in some examples, the view of the virtual object is displayed via a near-eye display of an HMD. As such, returning briefly to FIG. 3, method 300 optionally includes, at 310, displaying the virtual view via a near-eye display. As discussed above, the virtual object view is in some cases displayed such that it is aligned with its corresponding real-world object from the viewpoint of the HMD—e.g., as is shown in FIGS. 2A and 2C, where the pose of virtual object 208 is substantially aligned with real-world object 202. This beneficially enables the user to perceive and interact with real-world objects even while participating in VR experiences.

However, it will be understood that, in other examples, the virtual object view is displayed by any suitable image-forming componentry other than a near-eye display of an HMD. Furthermore, in some examples, the virtual object view is rendered but not ultimately displayed for viewing—e.g., the virtual object view is used to facilitate a robotic pick-and-place task, and/or for any other suitable purpose.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
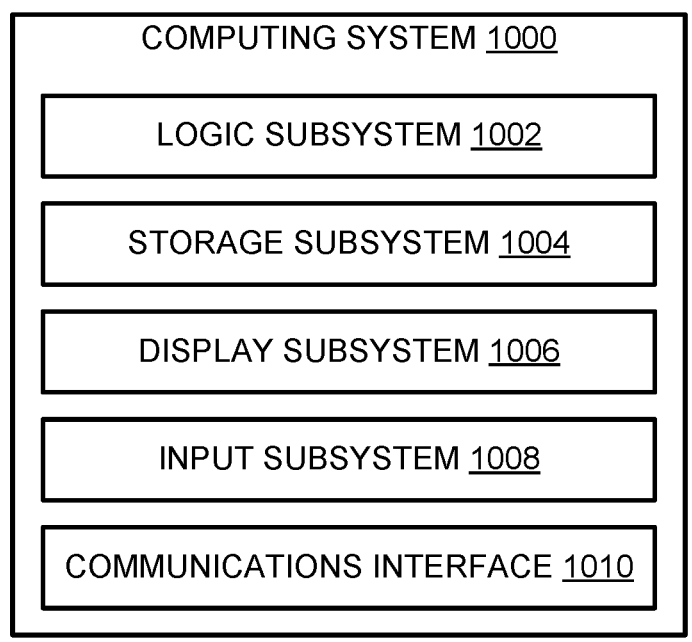
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML) and/or artificial intelligence (AI). Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for virtual object pose rendering comprises: receiving a digital image of a real-world object in a real-world environment; estimating an imaged pose of the real-world object based at least in part on a neural radiance model encoding 3D (three-dimensional) spatial data for the real-world object, the neural radiance model derived from a plurality of previously captured digital images of the real-world object; and rendering a view of a virtual object corresponding to the real-world object based at least in part on the neural radiance model, such that the virtual object has a virtual pose consistent with the imaged pose of the real-world object in the digital image. In this example or any other example, the view of the virtual object is rendered by a head-mounted display device (HMD), and the method further comprises displaying the view of the virtual object via a near-eye display of the HMD. In this example or any other example, the HMD displays the view of the virtual object as part of a virtual environment such that, from a virtual viewpoint of the HMD, the virtual object is aligned with the real-world object. In this example or any other example, the method further comprises displaying one or more virtual annotations proximate to the virtual object. In this example or any other example, the digital image of the real-world object is captured via a camera of the HMD. In this example or any other example, the plurality of previously captured digital images of the real-world object are captured via a camera of the HMD. In this example or any other example, the view of the virtual object is rendered by a server computing device that receives the digital image of the real-world object over a computer network, and transmits the view of the virtual object over the computer network for display by an HMD. In this example or any other example, the imaged pose of the real-world object is estimated by an inference model, the inference model previously-trained based at least in part on a plurality of synthetic object views generated from the 3D spatial data of the neural radiance model. In this example or any other example, generating the plurality of synthetic object views includes varying one or more of lighting conditions, background conditions, occlusions, and a virtual object pose between one or more of the plurality of synthetic object views. In this example or any other example, the neural field model is previously-trained to output arbitrary virtual poses of the virtual object based at least in part on the 3D spatial data for the real-world object. In this example or any other example, the neural field model is further trained to estimate the imaged pose of the real-world object, and output the virtual pose consistent with the imaged pose, based at least in part on 2D (two-dimensional) to 3D dense correspondences between the digital image and the 3D spatial data of the neural field model. In this example or any other example, the method further comprises updating the neural field model with additional 3D spatial data derived from the digital image. In this example or any other example, the real-world object is a single, specific real-world object.

In an example, a head-mounted display device (HMD) comprises: a camera; a near-eye display; a logic subsystem; and a storage subsystem holding instructions executable by the logic subsystem to: via the camera, capture a digital image of a real-world object in a real-world environment; estimate an imaged pose of the real-world object based at least in part on a neural radiance model encoding 3D (three-dimensional) spatial data for the real-world object, the neural radiance model derived from a plurality of previously captured digital images of the real-world object; render a view of a virtual object corresponding to the real-world object based at least in part on the neural radiance model, such that the virtual object has a virtual pose consistent with the imaged pose of the real-world object in the digital image; and display the view of the virtual object via the near-eye display. In this example or any other example, the HMD displays the view of the virtual object as part of a virtual environment such that, from a virtual viewpoint of the HMD, the virtual object is aligned with the real-world object. In this example or any other example, the plurality of previously captured digital images of the real-world object are captured via the camera of the HMD. In this example or any other example, the imaged pose of the real-world object is estimated by an inference model, the inference model previously-trained based at least in part on a plurality of synthetic object views generated from the 3D spatial data of the neural radiance model. In this example or any other example, the neural field model is further trained to estimate the imaged pose of the real-world object, and output the virtual pose consistent with the imaged pose, based at least in part on 2D (two-dimensional) to 3D dense correspondences between the digital image and the 3D spatial data of the neural field model. In this example or any other example, the instructions are further executable to update the neural field model with additional 3D spatial data derived from the digital image.

In an example, a method for virtual object pose rendering comprises: receiving, from a remote head-mounted display device (HMD), a digital image of a real-world object in a real-world environment via a computer network; estimating an imaged pose of the real-world object based at least in part on a neural radiance model encoding 3D (three-dimensional) spatial data for the real-world object, the neural radiance model derived from a plurality of previously captured digital images of the real-world object; rendering a view of a virtual object corresponding to the real-world object based at least in part on the neural radiance model, such that the virtual object has a virtual pose consistent with the imaged pose of the real-world object in the digital image; and transmitting the view of the virtual object to the HMD for display via the computer network.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for virtual object pose rendering, the method comprising:
   receiving a digital image of a real-world object in a real-world environment;
   estimating an imaged pose of the real-world object based at least in part on a neural radiance model encoding 3D (three-dimensional) spatial data for the real-world object, the neural radiance model derived from a plurality of previously captured digital images of the real-world object, wherein the neural radiance model is used to generate a plurality of synthetic images resembling the real-world object, and the plurality of synthetic images are used to train an inference model, wherein one or more visual characteristics are varied between the plurality of synthetic images, the one or more visual characteristics including one or more of lighting conditions, background conditions, occlusion conditions, and virtual object poses in the plurality of synthetic images, and wherein the inference model is used to estimate the imaged pose of the real-world object; and
   rendering a view of a virtual object corresponding to the real-world object based at least in part on the neural radiance model, such that the virtual object has a virtual pose consistent with the imaged pose of the real-world object in the digital image.

2. The method of claim 1, wherein the view of the virtual object is rendered by a head-mounted display device (HMD), and the method further comprises displaying the view of the virtual object via a near-eye display of the HMD.

3. The method of claim 2, wherein the HMD displays the view of the virtual object as part of a virtual environment such that, from a virtual viewpoint of the HMD, the virtual object is aligned with the real-world object.

4. The method of claim 2, further comprising displaying one or more virtual annotations proximate to the virtual object.

5. The method of claim 2, wherein the digital image of the real-world object is captured via a camera of the HMD.

6. The method of claim 2, wherein the plurality of previously captured digital images of the real-world object are captured via a camera of the HMD.

7. The method of claim 1, wherein the view of the virtual object is rendered by a server computing device that receives the digital image of the real-world object over a computer network, and transmits the view of the virtual object over the computer network for display by an HMD.

8. The method of claim 1, wherein the neural radiance model is previously-trained to output arbitrary virtual poses of the virtual object based at least in part on the 3D spatial data for the real-world object.

9. The method of claim 1, wherein the neural radiance model is further trained to estimate the imaged pose of the real-world object, and output the virtual pose consistent with the imaged pose, based at least in part on 2D (two-dimensional) to 3D dense correspondences between the digital image and the 3D spatial data of the neural radiance model.

10. The method of claim 1, further comprising updating the neural radiance model with additional 3D spatial data derived from the digital image.

11. The method of claim 1, wherein the real-world object is a single, specific real-world object.

12. A head-mounted display device (HMD), comprising:
   a camera;
   a near-eye display;
   a logic subsystem; and
   a storage subsystem holding instructions executable by the logic subsystem to:
      via the camera, capture a digital image of a real-world object in a real-world environment;
      estimate an imaged pose of the real-world object based at least in part on a neural radiance model encoding 3D (three-dimensional) spatial data for the real-world object, the neural radiance model derived from a plurality of previously captured digital images of the real-world object, wherein the neural radiance model is used to generate a plurality of synthetic images resembling the real-world object, and the plurality of synthetic images are used to train an inference model, wherein one or more visual characteristics are varied between the plurality of synthetic images, the one or more visual characteristics including one or more of lighting conditions, background conditions, occlusion conditions, and virtual object poses in the plurality of synthetic images, and wherein the inference model is used to estimate the imaged pose of the real-world object;
      render a view of a virtual object corresponding to the real-world object based at least in part on the neural radiance model, such that the virtual object has a virtual pose consistent with the imaged pose of the real-world object in the digital image; and
      display the view of the virtual object via the near-eye display.

13. The HMD of claim 12, wherein the HMD displays the view of the virtual object as part of a virtual environment such that, from a virtual viewpoint of the HMD, the virtual object is aligned with the real-world object.

14. The HMD of claim 12, wherein the plurality of previously captured digital images of the real-world object are captured via the camera of the HMD.

15. The HMD of claim 12, wherein the neural radiance model is further trained to estimate the imaged pose of the real-world object, and output the virtual pose consistent with the imaged pose, based at least in part on 2D (two-dimensional) to 3D dense correspondences between the digital image and the 3D spatial data of the neural radiance model.

16. The HMD of claim 12, wherein the instructions are further executable to update the neural radiance model with additional 3D spatial data derived from the digital image.

17. A method for virtual object pose rendering, the method comprising:
  receiving, from a remote head-mounted display device (HMD), a digital image of a real-world object in a real-world environment via a computer network;
  estimating an imaged pose of the real-world object based at least in part on a neural radiance model encoding 3D (three-dimensional) spatial data for the real-world object, the neural radiance model derived from a plurality of previously captured digital images of the real-world object, wherein the neural radiance model is used to generate a plurality of synthetic images resembling the real-world object, and the plurality of synthetic images are used to train an inference model, wherein one or more visual characteristics are varied between the plurality of synthetic images, the one or more visual characteristics including one or more of lighting conditions, background conditions, occlusion conditions, and virtual object poses in the plurality of synthetic images, and wherein the inference model is used to estimate the imaged pose of the real-world object;
  rendering a view of a virtual object corresponding to the real-world object based at least in part on the neural radiance model, such that the virtual object has a virtual pose consistent with the imaged pose of the real-world object in the digital image; and
  transmitting the view of the virtual object to the HMD for display via the computer network.

* * * * *